United States Patent [19]

Watanabe

[11] Patent Number: 4,479,398

[45] Date of Patent: Oct. 30, 1984

[54] ANTI-JAMMING MECHANISM FOR LINEAR TRANSLATORY DEVICE

[75] Inventor: Shunso F. Watanabe, Livonia, Mich.

[73] Assignee: Ford Motor Company, Dearborn, Mich.

[21] Appl. No.: 425,828

[22] Filed: Sep. 28, 1982

[51] Int. Cl.³ .................. F16H 27/02; F16H 1/18
[52] U.S. Cl. .................. 74/89.15; 74/424.8 R
[58] Field of Search .................. 74/89.15, 424.8 R; 187/24, 25; 248/406.1; 254/98

[56] References Cited

U.S. PATENT DOCUMENTS

| | | | |
|---|---|---|---|
| 2,705,428 | 4/1955 | McCullough | 74/575 |
| 2,771,787 | 11/1956 | Dixon | 254/98 |
| 2,881,454 | 4/1959 | Moneymaker | 10/129 |
| 3,178,957 | 4/1965 | Martens | 74/424.8 |
| 3,229,544 | 1/1966 | Haller | 74/424.8 |
| 3,277,737 | 10/1966 | Goodman | 74/424.8 |
| 3,334,526 | 8/1967 | Florsheim | 74/424.8 R |
| 3,355,959 | 12/1967 | Whicker | 74/424.8 R |
| 3,707,930 | 1/1973 | Vindra et al. | 74/424.8 |
| 4,234,152 | 11/1980 | Browse | 248/406.5 |
| 4,323,345 | 4/1982 | Wallshein | 254/98 |
| 4,352,300 | 10/1982 | Esch | 74/89.15 |

FOREIGN PATENT DOCUMENTS 691631  10/1979  U.S.S.R. .................. 74/89.15

Primary Examiner—Lawrence J. Staab
Assistant Examiner—Michael J. Gonet
Attorney, Agent, or Firm—Robert E. McCollum; Clifford L. Sadler

[57] ABSTRACT

An anti-jamming mechanism for a device providing linear rotary movements consisting of a simple one-piece collar having split end portions with one of the portions anchoring the collar to a rotatable and axially movable sleeve driven by a screw mechanism, the other end portion acting as a spring-like flexible finger reacting against a stepped stationary housing portion to stop rotation of the sleeve while permitting its axial movement upon continued rotation of the screw until the finger clears the end of the step, whereupon the sleeve is permitted to rotate freely with the screw without further axial movement.

8 Claims, 5 Drawing Figures

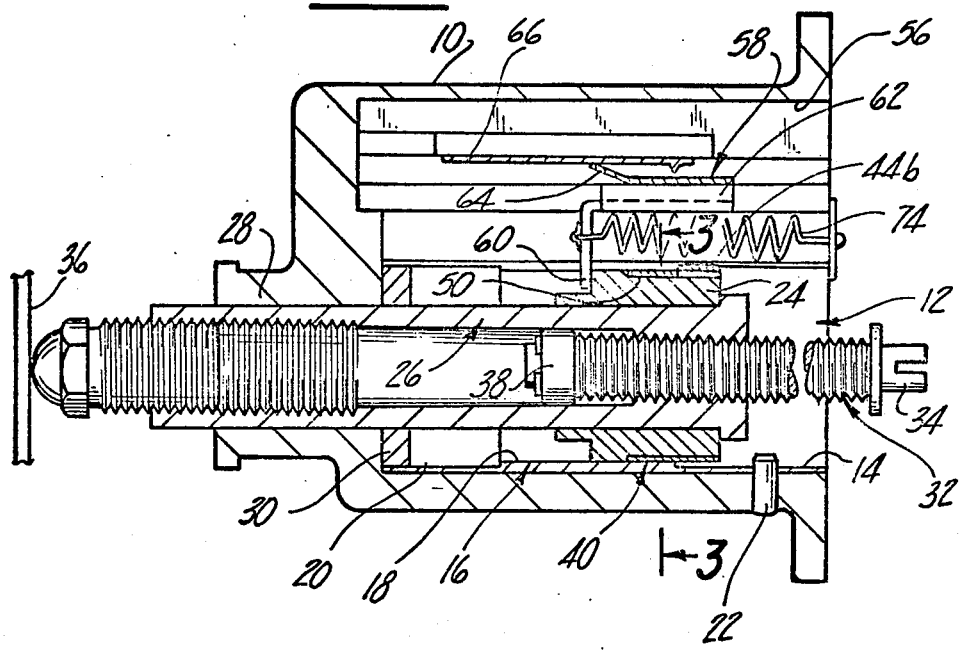
*Fig-1*
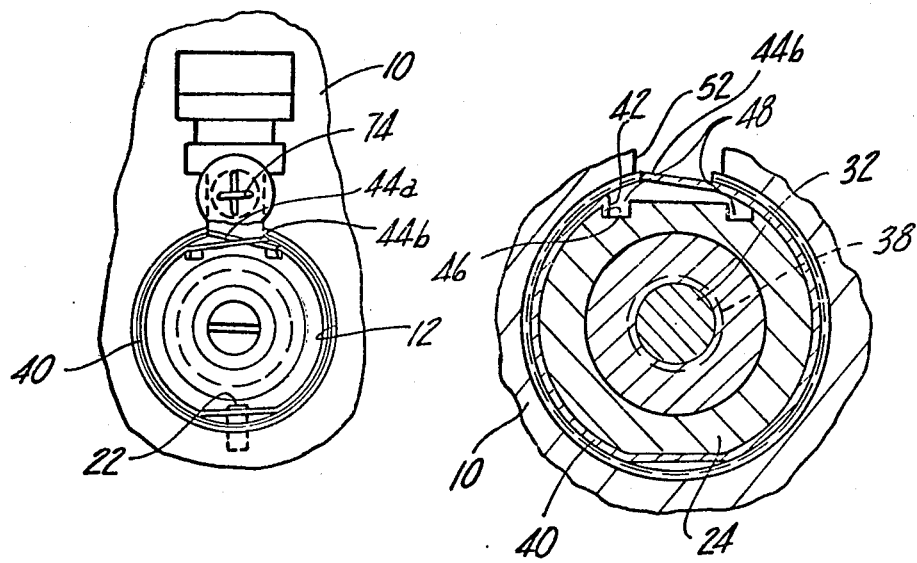
*Fig-2*  *Fig-3*

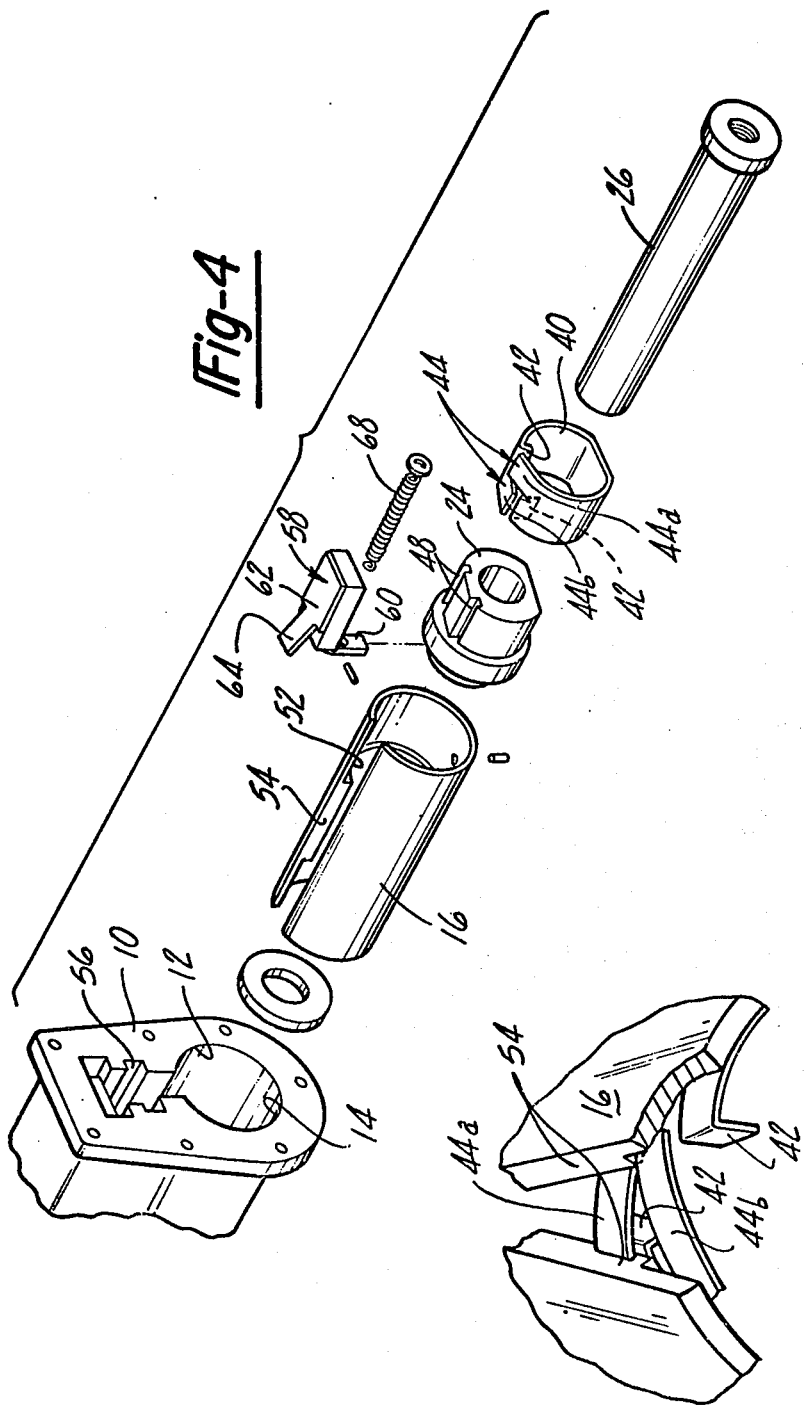

ANTI-JAMMING MECHANISM FOR LINEAR TRANSLATORY DEVICE

This invention relates in general to an anti-jamming device for a screw drive mechanism or the like that translates rotary to linear motion. More particularly, it relates to a device for preventing overrun of a screw drive or the like when the desired limit of axial movement is reached, to prevent jamming of the cooperating members.

Most anti-jamming devices that are associated with mechanisms of their type usually are complicated and require a multiplicity of parts. For example, Haller, U.S. Pat. No. 3,229,544, shows a screw drive including a pair of nuts 8 and 9 that can be clamped to an outer non-rotating but axially movable tube 14 by means of a spring 33. A bushing 10 connected to the nuts has an axial slot 35a in which is movably located a link 36 that is attached to the two ends of spring 33. A drive by the screw 5a exerts a reaction force on link 36 pivoting it to contract the spring and hold bushing 10 and nuts 8 and 9 against rotation. The nuts then move axially until a stop 54 is engaged, at which point the link 36 moves to expand the spring. This releases the nuts for rotation with the screw to thereby provide a freewheeling action ending the axial movement. It will be noted that Haller requires the use of a link, duplicate compression springs, bushings and sleeves and many other parts.

Goodman, U.S. Pat. No. 3,277,737, shows a device having a screw 22 engagable with a nut 16 that is held frictionally against a tube 12 by projecting pins 20 until a laterally extending lug 24 on the screw engages an axially extending lug 26 on the nut to prevent further relative rotation and thereby terminate axial movement. A slot 30 maintains frictional engagement of the nut with the housing to compensate for wear.

Moneymaker, U.S. Pat. No. 2,881,454, shows a tapping tool having a slidable mandrel 2 that carries a pair of rollers 6 and 7 that move longitudinally on grooves 4 and 5 until they reach a recess 16. A pair of dogs 17 engaging grooves 19 in a collar 13 normally lock the mandrel 2 to a sleeve 3 to drive the tool 10. The movement of collar 13 against its spring load by the rollers entering recess 16 disengages dogs 17 from grooves 19 and permits a freewheeling movement of mandrel 2 relative to the sleeve 3.

Martens, U.S. Pat. No. 3,178,957, shows a screw drive 15 in which a cage 46 has helically ramped ears 50 at opposite ends for cooperation with stops 54 to end axial movement of the cage.

Vindra et al, U.S. Pat. No. 3,707,930, shows an overrunning clutch-nut assembly in which a recess 28 in a housing 25 normally holds a nut 29 against rotation to provide an axial movement of the nut. When an obstruction is encountered by housing 25, nut 29 continues to move downwardly out of recess 28 to provide a freewheeling action terminating axial movement.

McCullough, U.S. Pat. No. 2,705,428, shows a ratchetable one-way drive device for a clock that includes a springable finger serving as a reaction member in one direction and a ratcheting member in the opposite direction.

This invention accomplishes the objectives of the above devices by a much simpler mechanism consisting of a thin flexible collar type latch having spring-like ends that either act as a reaction member or ratchet, depending upon the direction of rotation, to effect a non-rotative axial movement up to a designated point, and thereafter a freewheeling rotative nonaxial movement.

It is, therefore, a primary object of the invention to provide a simple anti-jamming mechanism that will convert rotary motion to an axial movement up to a predetermined point whereupon the axial movement is immediately terminated even though the rotary movement may continue.

It is another object of the invention to provide an anti-jamming mechanism of the type described consisting of a collar type latch having spring-like tang ends extending in opposite circumferential directions in a side-by-side relationship and cooperating with a pair of stepped diameter surfaces on a stationary member to prevent rotation of the collar in either direction until axial movement of the collar clears one end or the other of the step, whereupon a freewheeling, nonaxial rotary movement of the collar is then achieved.

Other objects, features and advantages of the invention will become more apparent upon reference to the succeeding detailed description thereof, and to the drawings illustrating the preferred embodiment thereof; wherein, FIG. 1 is a cross-sectional view of a rotary-to-linear motion device embodying the invention;

FIG. 2 is an end view of the device shown in FIG. 1;

FIG. 3 is an enlarged cross-sectional view taken on a plane indicated by and viewed in the direction of the arrows 3—3 of FIG. 1;

FIG. 4 is an exploded perspective view of the mechanism shown in FIG. 1; and,

FIG. 5 is a perspective enlarged view of a detail shown in FIG. 3.

The particular anti-jamming mechanism to be described is used in this particular instance in connection with a screw drive for controlling movement of the accelerator pedal of a motor vehicle to move the carburetor throttle valve open to allow more air/fuel charge flow to the engine. This would be particularly useful during operation of the engine in a speed control range from idle speed to wide open throttle conditions. It also could be used to control the throttle valve movement in the lower idle speed range between an essentially closed throttle valve and fast idle speed position.

The mechanism shown in FIG. 1 includes an outer stationary housing 10, which, as shown in FIGS. 2 and 4, has a keyhole shaped stepped diameter bore 12. The tubular lower cylindrical portion 14 of bore 12 is fitted with a stepped diameter sleeve 16 having a step 18 of lesser inner diameter than a pair of end portions 20. The end portions are shown extending symmetrically from step portion 18, although it will be clear that this is a matter of choice. A pin 22 axially locates sleeve 16 relative to housing 10 as well as provides a stop for a purpose to be described.

Slidably and rotatably mounted within sleeve 16 on step 18 is a piston-like member 24 secured to a tubular output sleeve shaft 26 that extends through a necked-down portion 28 of housing 10 as shown. A thrust bearing guide 30 radially locates and guides shaft 26 for a sliding movement within the housing.

The right end of sleeve shaft 26 is threadedly bored as illustrated for cooperation with the mating threads of in this case a left-hand screw 32. The latter is rotatably but nonaxially movably supported in a bushing, not shown, and adapted to be rotated or driven by an electric motor or the like that would be attached to the right hand slotted end 34. The sleeve 26 thus would act as a nut and move axially if restrained against rotation or, if not held, would rotate with screw 32. As stated previously, the axial movement of sleeve 26 causes a movement of the vehicle accelerator pedal indicated in part at 36. A bearing 38 provided on the end of screw 32 guides sleeve 26 to maintain axial alignment of the sleeve on the screw.

Piston 24 is adapted to be held against rotation or released, as the case may be, by means of a collar type latch 40 that surrounds a reduced diameter portion of piston 24. The latch, as best seen in FIG. 4, consists of a thin spring-like one-piece member with the ends having split parts 42, 44. The parts 42 are bent radially inwardly into anchoring engagement with radial walls 46 defined by a pair of axially extending slots 48 formed in piston 24.

Each of the end parts 44 of latch 40 extends radially outwardly to a point between the inner diameters of step 18 and the end portions 20 of sleeve 16, as best seen in FIGS. 3 and 5. Parts 44 constitute flexible finger-like portions or tangs that are axially adjacent one another and extend circumferentially in opposite directions. In this case, step 18 of sleeve 16 is provided with a narrow longitudinal slot 52 that provides radial faces 54 on facing sides against which the ends of the flexible finger-like portions 44 abut.

As best seen by referring to FIGS. 2 and 5, assume clockwise rotation of screw 32 in one direction rotates shaft 26 counterclockwise. The finger-like tang 44b then abuts against the right-hand radial face 54 of step 18 to thereby constitute the tang as a reaction member preventing rotation in this direction of piston 24 and output sleeve shaft 26 to which it is attached. Assuming this rotation of screw 32 causes sleeve 26 to move axially to the right as seen in FIG. 1, continued rotation then will move sleeve 26 until the tang portion 44b clears the right end of step 18. At this time, the end of portion 44b will project radially outwardly less than the inner diameter surface of end portions 20 of sleeve 16 and permit a clockwise rotation of output shaft 26 and piston 24 with screw 32, thereby terminating axial movement of the output shaft. The remaining tang end portion 44a, facing in the opposite direction, at this time will merely ratchet upon the inner surface of step 18 as piston 24 rotates within the sleeve 16.

When screw 32 is rotated in the opposite direction, tang or flexible finger 44a now becomes the reaction member since it will butt against the opposite right-hand radial face 54 of step 18 and prevent rotation of piston 24 and output sleeve shaft 26. The latter, therefore, moves leftwardly with the finger portion 44a merely ratcheting on the inner surface of step 18. Again, when finger portion 44a clears the left end of step 18, as seen in FIG. 1, it then will permit a freewheeling rotation of piston 24 and output sleeve shaft 26 with screw 32 and thereby terminate axial movement of the output shaft. The other remaining tang 44b will merely ratchet in a clockwise direction on the surface of step 18.

The assembly also includes a position indicator 60 that is adapted to be connected electrically to a microprocessor, not shown. The latter would also receive input signals from various portions of the engine indicating operating conditions, such as manifold vacuum levels, speed, ignition timing, etc., and would provide an output to the reversible electric motor driving screw 32 to control the drive to locate the accelerator pedal 36 according to a predetermined schedule. More specifically, located in the upper bore 56 of housing 10 is a slider 58 consisting of a finger 60 engagable with piston 24 and a body portion 62 carrying a flexible contact 64. The contact would move along a bus bar type plate 66 (FIG. 1) providing a varying voltage output signal to the microprocessor as the contact 64 moves with piston 24 upon rotation of screw 32. A spring 68 urges the slider and piston 24 to the right as indicated.

The operation is believed to be clear from the above description and a consideration of the drawings and, therefore, will not be repeated in detail. Suffice it to say that rotation of screw 32 by the reversible motor will engage one or the other of tangs 44a or 44b with the appropriate radial face 54 of step 18 defined by slot 52 to provide a reaction member for holding the piston 24 against rotation. Accordingly, piston 24 and output sleeve shaft 26 will thread itself along screw 32 to move the accelerator pedal 36. When piston 24 and collar 40 move sufficiently to the left or right, as the case may be, to clear the particular engaged finger 44 from the wall 54 of step 18, then piston 24 and output shaft 26 will be free to rotate with screw 32 and axial movement of the output shaft will be terminated. The accelerator pedal 36 then will be in a set position to maintain a set speed level, for example. The rotation of collar 40 will be permitted by a ratcheting of the opposite facing end tang 44 on the inner surface of step 18.

From the foregoing, it will be seen that the invention provides a mechanism to prevent continued axial movement of a linear movable device upon reaching a predetermined point, even though the rotary drive is continued, and that this is accomplished through the use of a simple spring-like collar with flexible tang-like ends constituting either reaction members or ratcheting members to either establish or terminate axial movement.

While the invention has been shown and described in its preferred embodiment, it will be clear to those skilled in the arts to which it pertains that many changes and modifications may be made thereto without departing from the scope of the invention. For example, the screw thread drive 32 shown could be replaced by a helical ball drive unit, or a nonscrew type rotary-to-linear drive, as a matter of choice.

I claim:

1. An anti-jamming mechanism for a power operated rotary driven shaft such as a linear translatory screw drive device or the like, comprising a housing consisting of an outer stationary sleeve-like cylinder having an axially extending step projecting radially inwardly from the inner diameter thereof and spaced from both ends of the cylinder, the step having a slot through the cylinder wall extending axially from one end of the cylinder toward the other, a piston mounted for a sliding movement on the step, the piston having an axial bore therein containing a rotary-to-linear conversion drive mechanism providing axial movement of the piston relative to the drive mechanism upon holding the piston against rotation and a freewheeling unitary rotary movement of the piston and drive mechanism without axial translation of the piston upon releasing the piston for rotation, a spring-like sleeve latch fixedly secured around and to one end of the piston for unitary movement therewith and including a pair of flexible tanglike free ends axially adjacent one another and extending circumferentially in opposite directions radially outwardly to a point between the inner diameters of the step and cylinder whereby rotary movement of the latch and piston are prevented during axial movement of the piston upon engagement of one of the tang ends with a radial face of the step slot until the engaged tang end upon continued axial piston movement moves axially beyond one end of the step thereby permitting the freewheeling rotary movement of both the piston and latch as a unit without axial movement thereof.

2. A mechanism as in claim 1, the latch comprising a thin one-piece spring form collar one of the free tang ends extending in the same direction as rotation of the drive mechanism to react against the step slot radial wall when axially aligned therewith, the remaining free tang end extending in a direction opposite to the drive mechanism rotation to permit a rotary spring ratcheting of the remaining free tang end over the inner radial surface of the step when the one tang end has moved axially beyond one end of the step to a freewheeling position.

3. A mechanism as in claim 2, the inner surface of the step camming the remaining free flexible tang end radially inwardly during the ratcheting movement.

4. A mechanism as in claim 1, including a position sensor secured to the piston for indicating the axial position thereof.

5. An anti-jamming mechanism for a screw drive or the like comprising a tubular stationary housing, a sleeve within the housing having a stepped internal diameter defining lesser and greater diameter surfaces, a screw drive mechanism consisting of a nontranslatory rotatable screw interengaged with a matingly threaded shaft for axially moving the shaft upon rotation of the screw upon holding the shaft against rotation, and for effecting a freewheeling unitary rotary movement of the screw and shaft upon release of the shaft for rotation, and control means to automatically effect the freewheeling movement of the shaft in response to a predetermined axial movement of the shaft in at least one direction, said control means comprising a spring-like collar surrounding and fixed around a portion of the shaft and having a flexible finger at one end projecting radially outwardly, the sleeve having an axially extending slot defining at least one lesser diameter radial wall surface engagable by the finger to prevent rotation of the shaft in one direction and thereby effect a translatory axial movement of the shaft upon rotation of the screw, axial movement of the shaft and finger beyond the junction of the stepped diameter surfaces to the greater diameter surface removing the finger from engagement with the sleeve radial surface and permitting a freewheeling of the sleeve and collar without axial movement of the shaft, rotation of the screw and shaft in the opposite direction effecting a ratcheting of the finger over the lesser diameter surface.

6. A mechanism as in claim 5, wherein the collar includes a second flexible finger, the pair of flexible fingers being in a side-by-side relationship projecting circumferentially from opposite ends of the collar and in opposite directions, movement of one of the fingers to an axial freewheeling position effecting a ratcheting of the other finger over the lesser diameter surface upon rotation of the screw and shaft in the one direction and vice versa when the screw and shaft are rotated in the opposite direction.

7. A mechanism as in claim 6, the lesser diameter step surface being located symetrically between the greater diameter end portion sleeve inner surface.

8. A mechanism as in claim 7, including a position sensor movable with the collar to indicate the position of the same relative to each end and middle portions of the sleeve.

* * * * *